United States Patent
Yamamoto

(10) Patent No.: US 10,697,943 B2
(45) Date of Patent: Jun. 30, 2020

(54) AUTOMATIC ANALYSIS DEVICE

(71) Applicant: Shimadzu Corporation, Kyoto (JP)

(72) Inventor: Kohei Yamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 181 days.

(21) Appl. No.: 15/576,467

(22) PCT Filed: May 26, 2015

(86) PCT No.: PCT/JP2015/065137
§ 371 (c)(1),
(2) Date: Nov. 22, 2017

(87) PCT Pub. No.: WO2016/189668
PCT Pub. Date: Dec. 1, 2016

(65) Prior Publication Data
US 2018/0156761 A1  Jun. 7, 2018

(51) Int. Cl.
*G01N 35/00* (2006.01)
*G06F 3/0482* (2013.01)
*G01N 30/24* (2006.01)

(52) U.S. Cl.
CPC ....... *G01N 30/24* (2013.01); *G01N 35/00732* (2013.01); *G06F 3/0482* (2013.01);
(Continued)

(58) Field of Classification Search
CPC ... G01N 35/00732; G01N 2035/00891; G01N 2035/0091
See application file for complete search history.

(56) References Cited

U.S. PATENT DOCUMENTS

| | | | | |
|---|---|---|---|---|
| 2008/0031777 A1* | 2/2008 | Mashiko | ........ | G01N 35/00584 422/67 |
| 2008/0263468 A1* | 10/2008 | Cappione | ........ | G01N 35/00722 715/771 |
| 2017/0176480 A1* | 6/2017 | Moschell | ........ | G01N 35/00722 |

FOREIGN PATENT DOCUMENTS

| | | |
|---|---|---|
| CN | 101126762 A | 2/2008 |
| CN | 101790713 A | 7/2010 |

(Continued)

OTHER PUBLICATIONS

International Search Report dated Sep. 1, 2015 of corresponding International application No. PCT/JP2015/065137; 4 pgs.

(Continued)

*Primary Examiner* — Herbert K Roberts
(74) *Attorney, Agent, or Firm* — Maier & Maier, PLLC

(57) ABSTRACT

An automatic analysis device capable of effectively preventing incorrect container number input when analysis conditions are set. An image display area and text display area are provided in a setting screen. An image in which a selection area is assigned to each container number corresponding to a sample container is displayed in the image display area. If a selection area in the image display area is selected through operation unit operation, the container number expressing the selected selection area is displayed in the text display area (container number input part). If the container number expressing the selected sample container is displayed in the text display area (container number input part) as a result of operation unit operation, the display mode of the selection area corresponding to the container number is switched.

6 Claims, 7 Drawing Sheets

(52) U.S. Cl.
CPC ............... *G01N 2035/0091* (2013.01); *G01N 2035/00891* (2013.01)

(56) References Cited

FOREIGN PATENT DOCUMENTS

| | | |
|---|---|---|
| JP | H8-86784 A | 4/1996 |
| JP | H9-72911 A | 3/1997 |
| JP | 2009-8402 A | 1/2009 |
| JP | 2010-527469 A | 8/2010 |

OTHER PUBLICATIONS

Chinese Office Action dated Sep. 19, 2019, in connection with corresponding CN Application No. 201580080254.1 (16 pgs., including machine-generated English translation).

\* cited by examiner

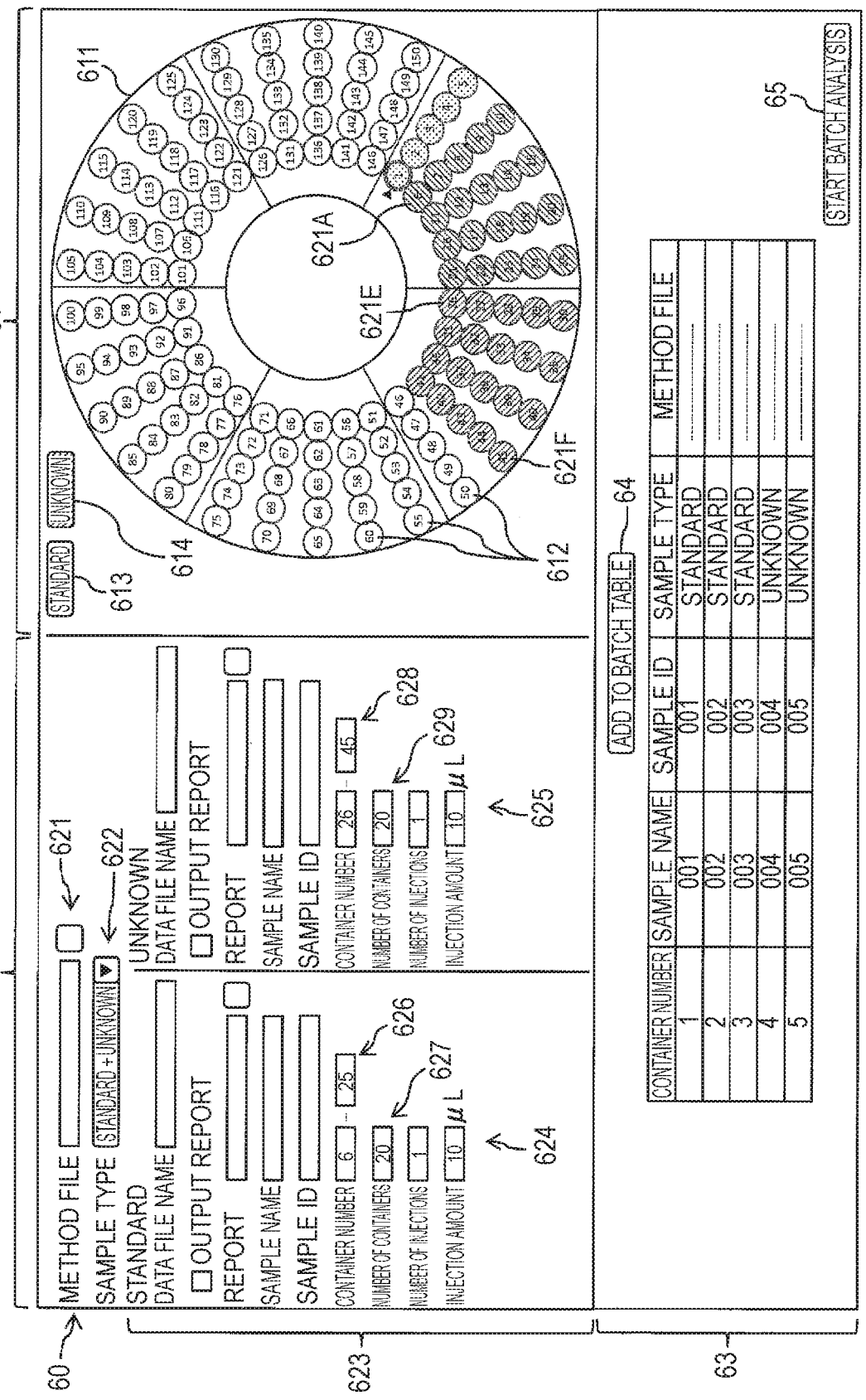

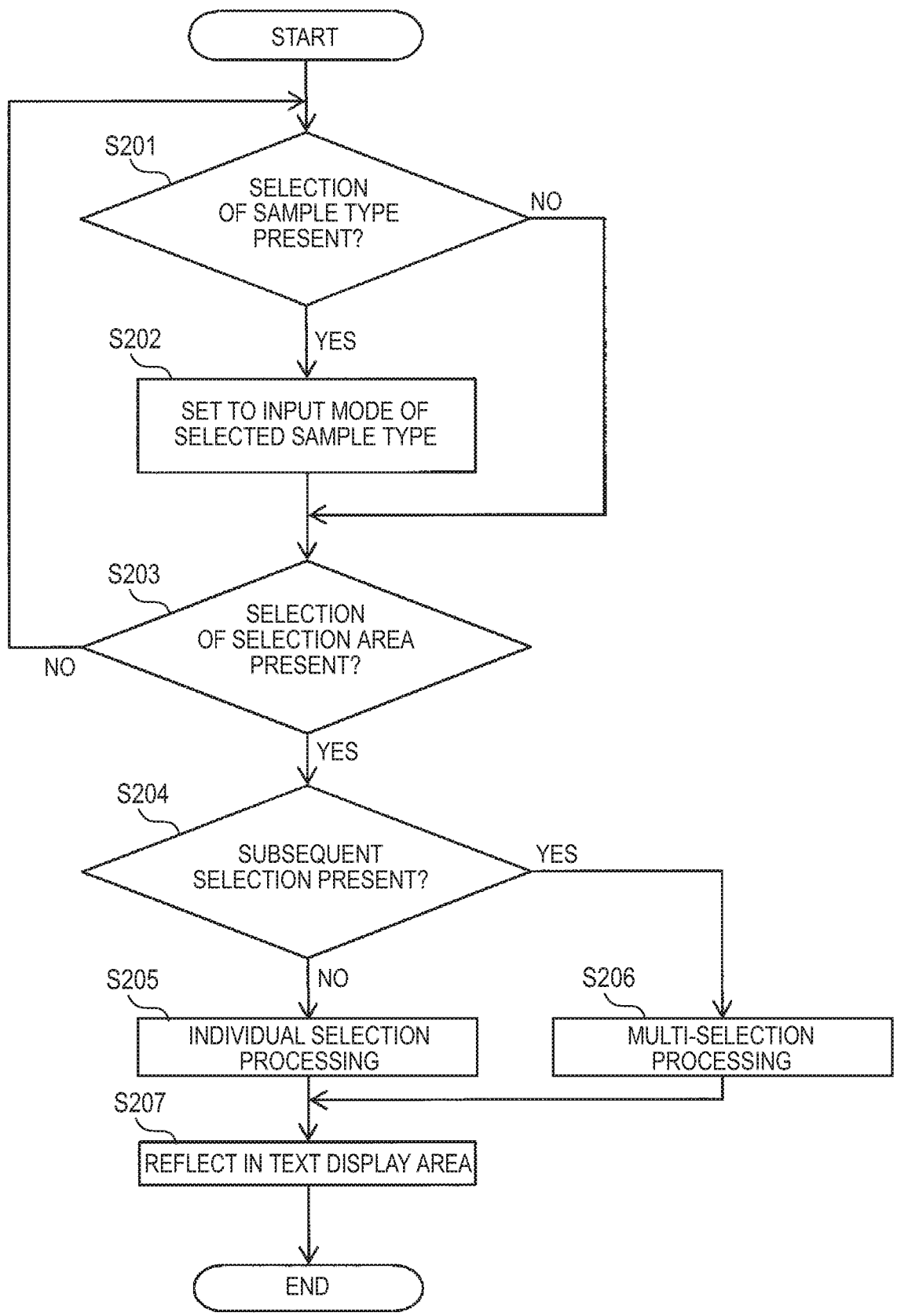

AUTOMATIC ANALYSIS DEVICE

TECHNICAL FIELD

The present invention relates to an automatic analysis device for automatically analyzing samples in a plurality of sample containers.

BACKGROUND

For example, an automatic analysis device such as liquid chromatograph (LC), gas chromatograph (GC), etc. includes a container holding unit that holds a plurality of sample containers (vials), and may automatically analyze a sample in each sample container. At the time of analysis, samples in respective sample containers are sequentially dispensed by a probe, and analysis is performed on each sample based on a preset analysis condition.

An analysis condition for a sample is set in advance as a method file by an operator inputting various parameters. Then, a batch file is created when a container number assigned to each sample container is associated with a method file executed with respect to a sample in each sample container. The batch file created in this way is stored in a storage unit, and analysis is successively performed for each sample based on the batch file (for example, see Patent Document 1 below).

A plurality of sample containers may be held in a container holding unit in association with different container numbers. At the time of creating the batch file, for example, when the operator successively sets each sample container in the container holding unit, and operates the operation unit while checking a setting screen displayed on the display unit, an operation of inputting a container number assigned to each sample container and an operation of associating a method file with each container number are performed.

CITATION LIST

Patent Document

Patent Document 1: JP-A-2009-8402

SUMMARY OF THE INVENTION

On the setting screen, for example, an arbitrary container number is input, and a method file associated with the container number is selected. However, for the operator performing a setting operation while checking the setting screen, it is difficult to intuitively recognize a container number assigned to each sample container held in the container holding unit, and thus a container number may be erroneously input in some cases.

In addition, a plurality of types of samples may be used for analysis. For example, in addition to a sample (unknown sample) containing an unknown component to be analyzed, various samples such as a standard sample containing a known component, a control sample added to the unknown sample, etc. are used depending on the purpose. Conventionally, different setting screens have been displayed on the display unit for the plurality of types of samples, and an operation of inputting a container number of a sample container containing each type of sample on each setting screen has been performed. For this reason, the same container number may be erroneously input on each setting screen in some cases.

When a container number is erroneously input, and a batch file is created without change as described above, desired analysis is not performed, and an erroneous analysis result is obtained. In particular, in an automatic analysis device that automatically analyzes samples in a plurality of sample containers, even when an erroneous analysis result is obtained for some samples, there is concern that the operator may not notice the erroneous analysis result. Therefore, there is concern that the erroneous analysis result may be used without change.

The invention has been conceived in view of the above circumstances, and an object of the invention is to provide an automatic analysis device capable of effectively preventing a container number from being erroneously input at the time of setting an analysis condition.

An automatic analysis device according to the invention includes a container holding unit, a display unit, an operation unit, a display controller, a storage unit, and an automatic analysis controller. The container holding unit holds a plurality of sample containers in association with different container numbers. The display unit displays a setting screen for setting an analysis condition for a sample in each of the sample containers. The operation unit is operated when setting on the setting screen is performed. The display controller switches a display of the setting screen based on an operation of the operation unit. The storage unit stores the analysis condition for the sample in each of the sample containers set by the setting screen. The automatic analysis controller automatically analyzes the sample in each of the sample containers based on the analysis condition stored in the storage unit.

An image display area and a text display area are included in the setting screen. An image to which a selection area is assigned for each container number corresponding to each of the sample containers is displayed in the image display area. A container number representing a selected sample container is displayed in the text display area. The display controller displays, in the text display area, a container number representing a selection area in the image display area when the selection area is selected by an operation of the operation unit. Alternatively, the display controller switches a display mode of a selection area corresponding to a container number representing a selected sample container when the container number is displayed in the text display area by an operation of the operation unit.

According to such a configuration, it is easy for an operator to intuitively recognize a container number corresponding to each sample container by an image displayed in the image display area of the setting screen. In addition, it is possible to perform an operation of inputting a container number to the text display area by selecting a selection area in the image display area, and it is possible to switch a display mode of a selection area corresponding to a container number by performing an operation of inputting the container number to the text display area, and thus a container number of a selected sample container is easy to visually recognize. Therefore, it is possible to effectively prevent a container number from being erroneously input at the time of setting an analysis condition.

When a plurality of types of samples is used, the display controller may simultaneously display the text display area corresponding to the respective types of samples on the setting screen.

According to such a configuration, since analysis conditions for the plurality of types of samples may be set on one setting screen, it is possible to prevent the same container number from being erroneously input with respect to different types of samples. Therefore, even when a plurality of types of samples is used, it is possible to effectively prevent a container number from being erroneously input at the time of setting an analysis condition.

In a case in which a selection area in the image display area has been previously selected for a different type of sample when the selection area is selected by an operation of the operation unit, the display controller may cancel one of the selections and display a container number representing the selected selection area in the text display area corresponding to a selected type of sample.

According to such a configuration, even when the same selection area is selected for different types of samples, one selection is canceled, and thus the same container number is not erroneously input. Therefore, even when a plurality of types of samples is used, it is possible to reliably prevent the container number from being erroneously input at the time of setting the analysis condition.

When two selection areas in the image display area are selected by an operation of the operation unit, the display controller may select container numbers corresponding to the two selection areas and a selection area between the two selection areas according to a predetermined order, and display the selected container numbers representing the selection areas in the text display area.

According to such a configuration, since the container numbers corresponding to the two selection areas and the selection area between the two selection areas may be selected only by selecting the two selection areas to perform an operation of inputting the container numbers to the text display area, it is possible to improve work efficiency.

The setting screen may include a batch table display area that displays a batch table in which a container number of each sample container selected on the setting screen is associated with an analysis condition for a sample in each sample container.

According to such a configuration, since content of the batch file created on the setting screen is displayed as a batch table in the batch table display area on the setting screen, the created content of the batch file may be easily confirmed. Therefore, it is possible to easily confirm a relation between a container number of each sample container and an analysis condition for a sample in each sample container, and thus it is possible to more effectively prevent a container number from being erroneously input at the time of setting an analysis condition.

A selection area corresponding to a container number added to the batch table, a selection area corresponding to a container number of a sample container selected on the setting screen without being added to the batch table, and a selection area corresponding to a container number of a sample container not selected on the setting screen without being added to the batch table may be displayed in different modes in the image display area.

According to such a configuration, it is possible to easily verify whether a selection area corresponds to the selection area corresponding to the container number added to the batch table, the selection area corresponding to a container number of the sample container selected on the setting screen without being added to the batch table, and the selection area corresponding to the container number of the sample container not selected on the setting screen without being added to the batch table according to the display modes of the respective selection areas. Therefore, a setting state of each selection area is easy to visually recognize, and thus it is possible to more effectively prevent a container number from being erroneously input at the time of setting an analysis condition.

According to the invention, it is easy for an operator to intuitively recognize a container number corresponding to each sample container, and a container number of a selected sample container is easy to visually recognize. Therefore, it is possible to effectively prevent a container number from being erroneously input at the time of setting an analysis condition.

BRIEF DESCRIPTION OF THE DRAWINGS

FIG. 3C is a diagram for description of a mode of selecting a container number of each sample container in the image display area of the setting screen.

FIG. 5 is a flowchart illustrating an example of processing by the controller when a setting operation for the image display area is performed.

DETAILED DESCRIPTION

Figure 1:
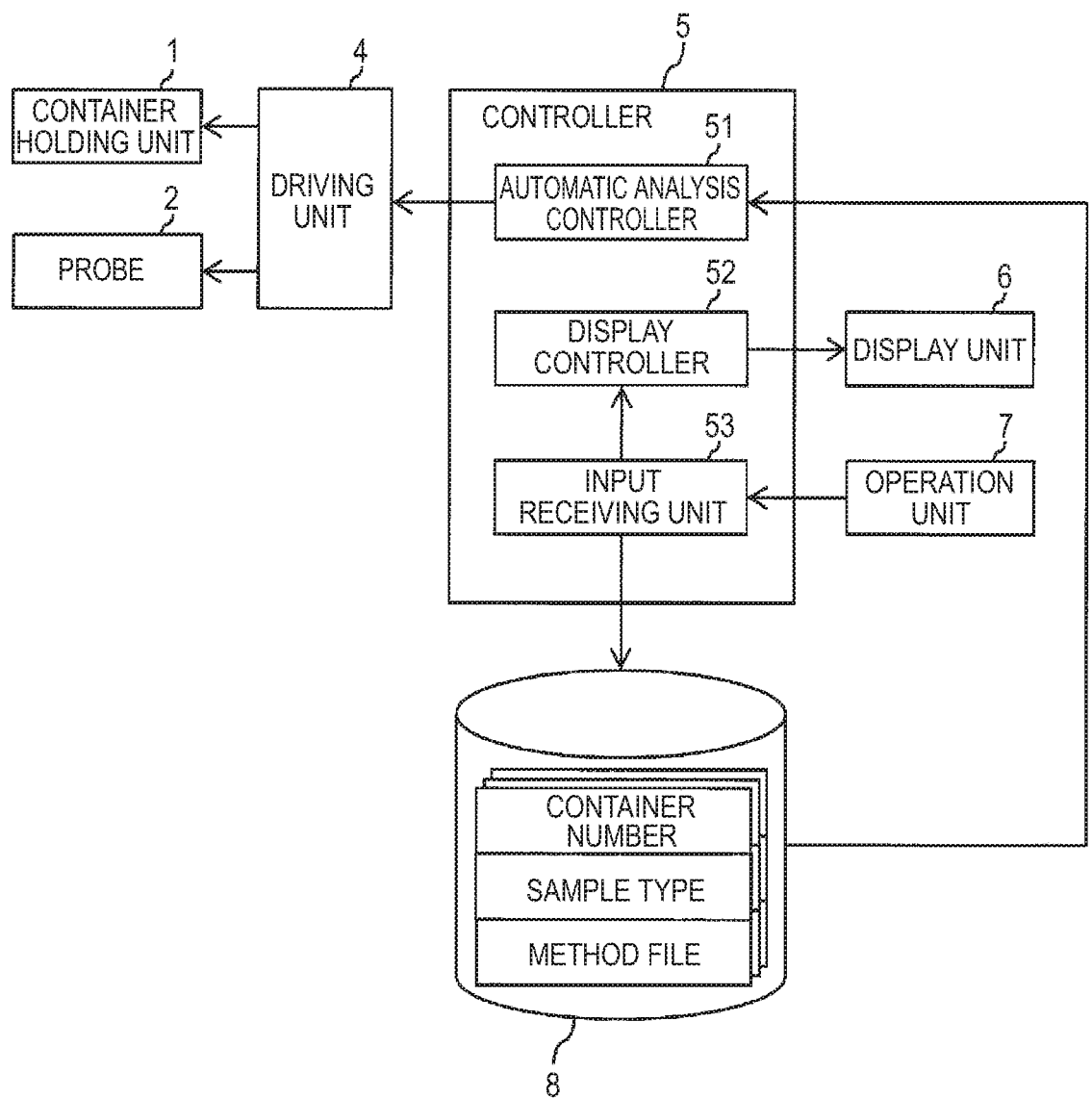
FIG. 1 is a block diagram illustrating a configuration example of an automatic analysis device according to an embodiment of the invention.

FIG. 1 is a block diagram illustrating a configuration example of an automatic analysis device according to an embodiment of the invention. For example, the automatic analysis device according to the present embodiment corresponds to LC or GC, and may automatically analyze samples in a plurality of sample containers. For example, the automatic analysis device includes a container holding unit 1, a probe 2, a driving unit 4, a controller 5, a display unit 6, an operation unit 7, a storage unit 8, etc.

A plurality of sample containers, each of which contains a sample, may be held in the container holding unit 1. A plurality of depressions (not illustrated) is formed in the container holding unit 1, and a plurality of sample containers is held while being accommodated in the respective depressions. Different numbers are described in association with the respective depressions in the container holding unit 1. In this way, while the sample containers are accommodated in the respective depressions, the respective sample containers may be held in association with different numbers (container numbers).

The probe 2 is successively inserted into each of the sample containers held in the container holding unit 1 to suck a sample in each of the sample containers from a distal end thereof. Specifically, when the container holding unit 1 rotates, each sample container held in the container holding unit 1 successively moves to a suction position, and a sample in each sample container is sucked by the probe 2 moved to the suction position. The probe 2 moves to a predetermined dispensing position after sucking the sample, and dispensing is completed when the sample is discharged to the dispensing position.

The sample dispensed at the dispensing position is successively analyzed based on a preset analysis condition. Such operations of the container holding unit 1 and the probe 2 are performed by driving of the driving unit 4 which includes, for example, a motor (not illustrated), etc.

For example, the controller 5 includes a central processing unit (CPU), and controls an overall operation of the automatic analysis device. The controller 5 functions as an automatic analysis controller 51, a display controller 52, an input receiving unit 53, etc. by the CPU executing a program. In addition to the driving unit 4 described above, the display unit 6, the operation unit 7, the storage unit 8, etc. are electrically connected to the controller 5.

For example, the display unit 6 includes a liquid crystal display, and displays a setting screen for setting an analysis condition, an analysis result, etc. For example, the operation unit 7 includes a keyboard, a mouse, etc., and various settings may be performed when the operator operates the operation unit 7. For example, the storage unit 8 includes a hard disk, a random access memory (RAM), etc., and stores various types of information such as a set analysis condition, an analysis result, etc.

The automatic analysis controller 51 automatically analyzes the sample in each sample container by controlling the driving unit 4 based on the analysis condition stored in the storage unit 8. That is, rotation of the container holding unit 1, movement, suction, discharge, etc. of the probe 2 are automatically performed under the control of the automatic analysis controller 51, and the sample dispensed at the dispensing position is analyzed.

The display controller 52 controls display on the display unit 6. The input receiving unit 53 performs a process of receiving information input by operating the operation unit 7. The display controller 52 can switch the display of the display unit 6 based on the information received by the input receiving unit 53. Further, the storage unit 8 can store the information received by the input receiving unit 53.

A setting screen for setting the analysis condition with respect to the sample in each sample container is displayed on the display unit 6 under the control of the display controller 5. The operator may perform setting on the setting screen displayed on the display unit 6 by operating the operation unit 7. When an input operation on the setting screen is performed by operating the operation unit 7 on the setting screen, the display controller 52 switches the display of the setting screen according to setting content.

The analysis condition for the sample in each sample container set by the setting screen is stored in the storage unit 8. On the setting screen, a type (sample type) of the sample accommodated in the sample container and a method file including various parameters serving as the analysis condition for the sample are set for each container number associated with each sample container. In this way, a batch file in which the container number, the sample type, and the method file are associated with one another is created, and the created batch file is stored in the storage unit 8.

Examples of the sample type may include a standard sample containing a known component, a control sample added to a known sample, etc. in addition to a sample (unknown sample) containing an unknown sample to be analyzed. A plurality of types of samples is selectively used according to the purpose. However, the sample type is not limited to the unknown sample, the standard sample, and the control sample, and analysis may be performed using various other samples.

When the automatic analysis controller 51 automatically performs analysis, the sample type and the method file are read from the storage unit 8 for each container number corresponding to each sample container based on the batch file stored in the storage unit 8. Then, when the automatic analysis controller 51 successively analyzes the sample in the sample container corresponding to each container number based on the read information, analysis on the sample in each sample container is continuously and automatically performed.

Figure 2:
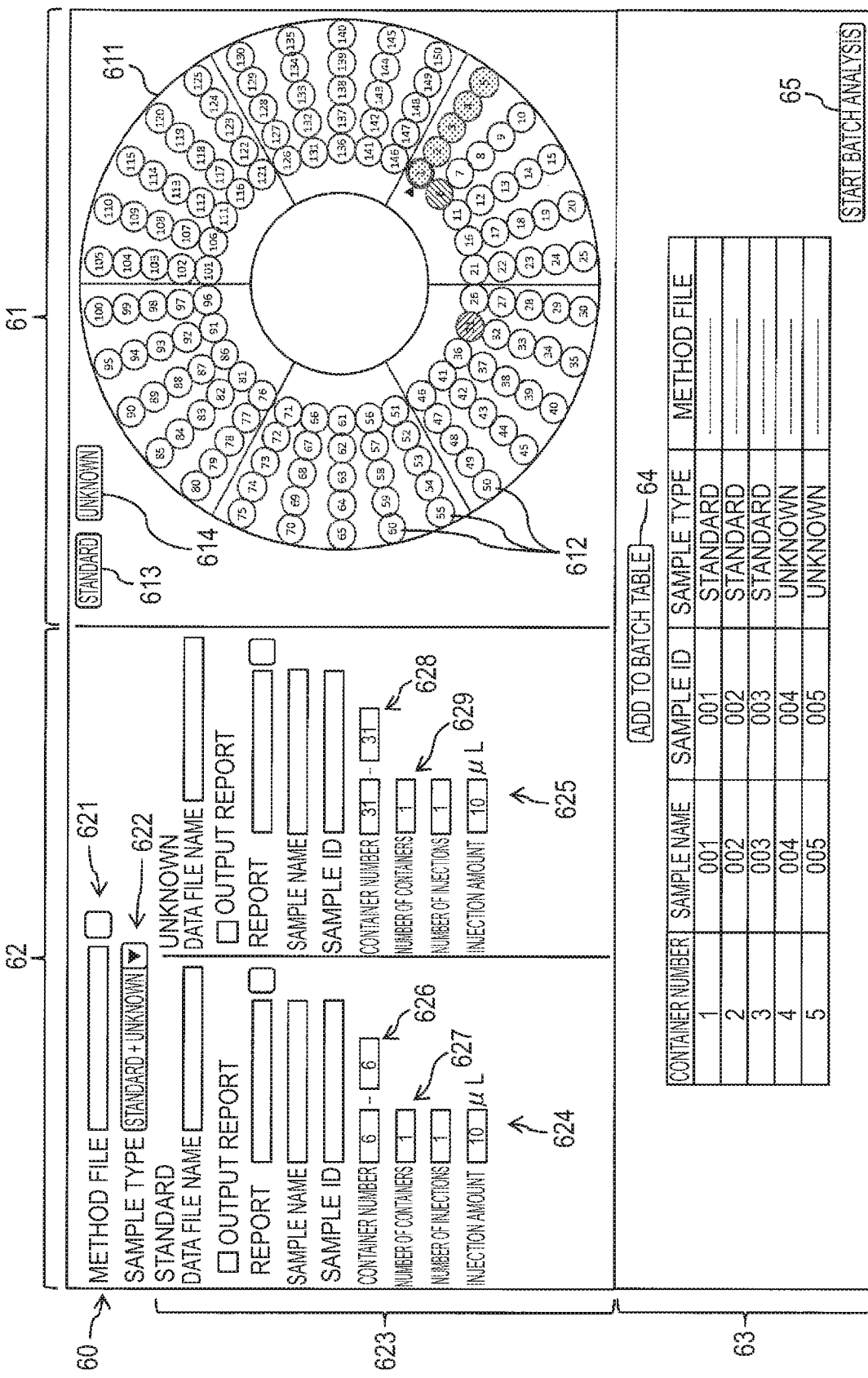
FIG. 2 is a diagram illustrating an example of a setting screen displayed on a display unit.

FIG. 2 is a diagram illustrating an example of a setting screen 60 displayed on the display unit 6. For example, the setting screen 60 includes an image display area 61, a text display area 62, and a batch table display area 63. The operator may create a batch file by performing a setting operation on the image display area 61 or the text display area 62 using the operation unit 7. Content of the created batch file is displayed as a batch table in the batch table display area 63.

An image 611 imitating a plan view of the container holding unit 1 is displayed in the image display area 61. Specifically, a plurality of selection areas 612 is displayed on the circular image 611 representing an external shape of the container holding unit 1 in association with a plurality of depressions for accommodating sample containers in the container holding unit 1. Each of the selection areas 612 may be individually selected by the operator operating the operation unit 7.

In this example, 150 selection areas 612 equal in number to the sample containers that can be held in the container holding unit 1 are provided, and container numbers "1" to "150" are displayed in association with the respective selection areas 612. In this way, the image 611, in which each of the selection areas 612 is assigned to each container number corresponding to each sample container, is displayed in the image display area 61. A selection area 612 corresponding to a smallest container number ("1" in this example) among the plurality of selection areas 612 is displayed in a different mode from that of another selection area 612, so that the operator may easily identify the area.

The image 611 displayed in the image display area 61 may be changed according to a type of the container holding unit 1. In this case, in addition to the external shape of the image 611, it is possible to change the number of selection areas 612 displayed in the image 611, an order of the container numbers associated with the respective selection areas 612, etc. according to the type of the container holding unit 1.

For example, a standard key 613 and an unknown key 614 are provided in the image display area 61. In more detail, the keys 613 and 614 for selection of the respective sample types are provided in the image display area 61 in association with the plurality of sample types, and an arbitrary selection area 612 in the image 611 may be selected after selecting any one of the keys 613 and 614. In this way, a container number may be set in association with a selected sample type.

For example, a method file selection part 621, a sample type selection part 622, and a text input part 623 are included in the text display area 62. When the operator selects a method file by operating the operation unit 7, a name of the selected method file is displayed in the method file selection part 621. When the operator selects a sample type by operating the operation unit 7, the selected sample type is displayed in the sample type selection part 622.

In this example, any one of "standard", "unknown", or "standard+unknown" may be selected as a sample type using the sample type selection part 622. "Standard" is selected at the time of setting an analysis condition for a standard sample. "Unknown" is selected at the time of setting an analysis condition for an unknown sample. "Standard+unknown" is selected at the time of simultaneously setting analysis conditions for a standard sample and an unknown sample.

An image corresponding to a sample type selected by the sample type selection part 622 is displayed in the text input part 623. In this example, when "standard+unknown" is selected as a sample type by the sample type selection part 622, a standard sample input part 624 for setting an analysis condition for the standard sample and an unknown sample input part 625 for setting an analysis condition for the unknown sample are displayed in the text input part 623. When "standard" is selected as a sample type, only the standard sample input part 624 is displayed in the text input part 623. When "unknown" is selected as a sample type, only the unknown sample input part 625 is displayed in the text input part 623.

For example, a container number input part 626 and a number-of-containers input part 627 are included in the standard sample input part 624. A container number representing a sample container selected from among a plurality of sample containers accommodating standard samples is displayed in the container number input part 626. The operator may select the sample container corresponding to the container number by directly inputting the container number to the container number input part 626 using the operation unit 7. In this case, a selection area 612 in the image display area 61 corresponding to the selected sample container is displayed in a different mode from that at the time of non-selection.

In addition, the operator may operate the operation unit 7 to select the standard key 613 in the image display area 61, and then select a selection area 612 corresponding to a sample container that accommodates the standard sample, thereby automatically inputting a container number corresponding to the selected selection area 612 to the container number input part 626. In this case, when the selection area 612 in the image display area 61 is selected, the selected selection area 612 is displayed in a different mode from that at the time of non-selection, and the container number corresponding to the selected selection area 612 is displayed in the container number input part 626.

In this example, container numbers corresponding to a plurality of sample containers may be selected and displayed in the container number input part 626. Specifically, when a start number and an end number of the container numbers are input to the container number input part 626, these container numbers (the start number and the end number) and a container number therebetween are selected and displayed in the container number input part 626. In FIG. 2, "6" is input as the start number and "6" is input as the end number to the container number input part 626 in the standard sample input part 624, so that only one container number "6" is selected. The number of selected container numbers is displayed in the number-of-containers input part 627.

The above-described display mode of the setting screen 60 is the same for the unknown sample input part 625. In more detail, for example, a container number input part 628 and a number-of-containers input part 629 are included in the unknown sample input part 625. A container number representing a sample container selected from among a plurality of sample containers accommodating unknown samples is displayed in the container number input part 628. The operator may select the sample container corresponding to the container number by directly inputting the container number to the container number input part 628 using the operation unit 7. In this case, a selection area 612 in the image display area 61 corresponding to the selected sample container is displayed in a different mode from that at the time of non-selection and at the time of selecting the standard mode.

In addition, the operator may operate the operation unit 7 to select the unknown key 614 in the image display area 61, and then select a selection area 612 corresponding to a sample container that accommodates the unknown sample, thereby automatically inputting a container number corresponding to the selected selection area 612 to the container number input part 628. In this case, when the selection area 612 in the image display area 61 is selected, the selected selection area 612 is displayed in a different mode from that at the time of non-selection and at the time of selecting the standard mode, and the container number corresponding to the selected selection area 612 is displayed in the container number input part 628.

In this example, container numbers corresponding to a plurality of sample containers may be selected and displayed in the container number input part 628 as in the case of selecting the standard sample. Specifically, when a start number and an end number of the container numbers are input to the container number input part 628, these container numbers (the start number and the end number) and a container number therebetween are selected and displayed in the container number input part 628. In FIG. 2, "31" is input as the start number and "31" is input as the end number to the container number input part 628 in the unknown sample input part 625, so that only one container number "31" is selected. The number of selected container numbers is displayed in the number-of-containers input part 629.

As described above, in the present embodiment, when a selection area 612 in the image display area 61 is selected by an operation of the operation unit 7, a container number of the selected selection area 612 is displayed in the text display area 62 (the text input part 623). In addition, when the container number, which represents a sample container, selected in the text display area 62 (the text input part 623) by the operation of the operation unit 7 is displayed, a display mode of the selection area 612 corresponding to the container number is switched.

According to the display mode of the setting screen 60 described above, it is easy for the operator to intuitively recognize a container number corresponding to each sample container through the image 611 displayed in the image display area 61 of the setting screen 60. In addition, it is possible to perform an operation of inputting a container number to the text display area 62 by selecting a selection area 612 in the image display area 61, and it is possible to switch a display mode of a selection area 612 corresponding to a container number by performing an operation of inputting the container number to the text display area 62, and thus a container number of a selected sample container is easy to visually recognize. Therefore, it is possible to effectively prevent a container number from being erroneously input at the time of setting an analysis condition.

In addition, as in the example of FIG. 2, when a plurality of types of samples (for example, the standard sample and the unknown sample) are used, the text display area 62 (the standard sample input part 624 and the unknown sample input part 625) corresponding to the respective types of samples is simultaneously displayed on the setting screen 60. In this case, since analysis conditions for the plurality of types of samples may be set on one setting screen 60, it is possible to prevent the same container number from being erroneously input with respect to different types of samples.

Therefore, even when a plurality of types of samples is used, it is possible to effectively prevent a container number from being erroneously input at the time of setting an analysis condition.

When an additional key 64 provided on the setting screen 60 is selected after a setting operation with respect to the image display area 61 or the text display area 62 is performed in the above-described mode, a batch file to which content set on the image display area 61 or the text display area 62 is added is created. As a result, content of the updated batch file is displayed as a batch table in the batch table display area 63.

In this instance, a plurality of container numbers may be associated with one method file, and set content may be added to the batch file. In more detail, after one method file is selected in the method file selection part 621, a plurality of container numbers is displayed in the container number input part 626 of the standard sample input part 624 or the container number input part 628 of the unknown sample input part 625. Further, when the additional key 64 is selected, the common method file is associated with the respective selected container numbers and added to the batch file.

As described above, in the batch table display area 63, a container number of each sample container selected on the setting screen 60 (the image display area 61 and the text display area 62) is associated with an analysis condition (method file) for a sample in each sample container and displayed as a batch table. In other words, since content of the batch file created on the setting screen 60 is displayed as a batch table in the batch table display area 63 on the setting screen 60, the created content of the batch file may be easily confirmed. Therefore, it is possible to easily confirm a relation between a container number of each sample container and an analysis condition for a sample in each sample container, and thus it is possible to more effectively prevent a container number from being erroneously input at the time of setting an analysis condition.

The addition to the batch table display area 63 may be performed a plurality of times by repeating a setting operation on the image display area 61 or the text display area 62 and an operation of selecting the additional key 64. When an analysis start key 65 provided on the setting screen 60 is selected after the batch file is created as described above, the samples in the sample containers corresponding to the respective container numbers are successively analyzed based on the created batch file, so that automatic analysis is executed.

Figure 3A:
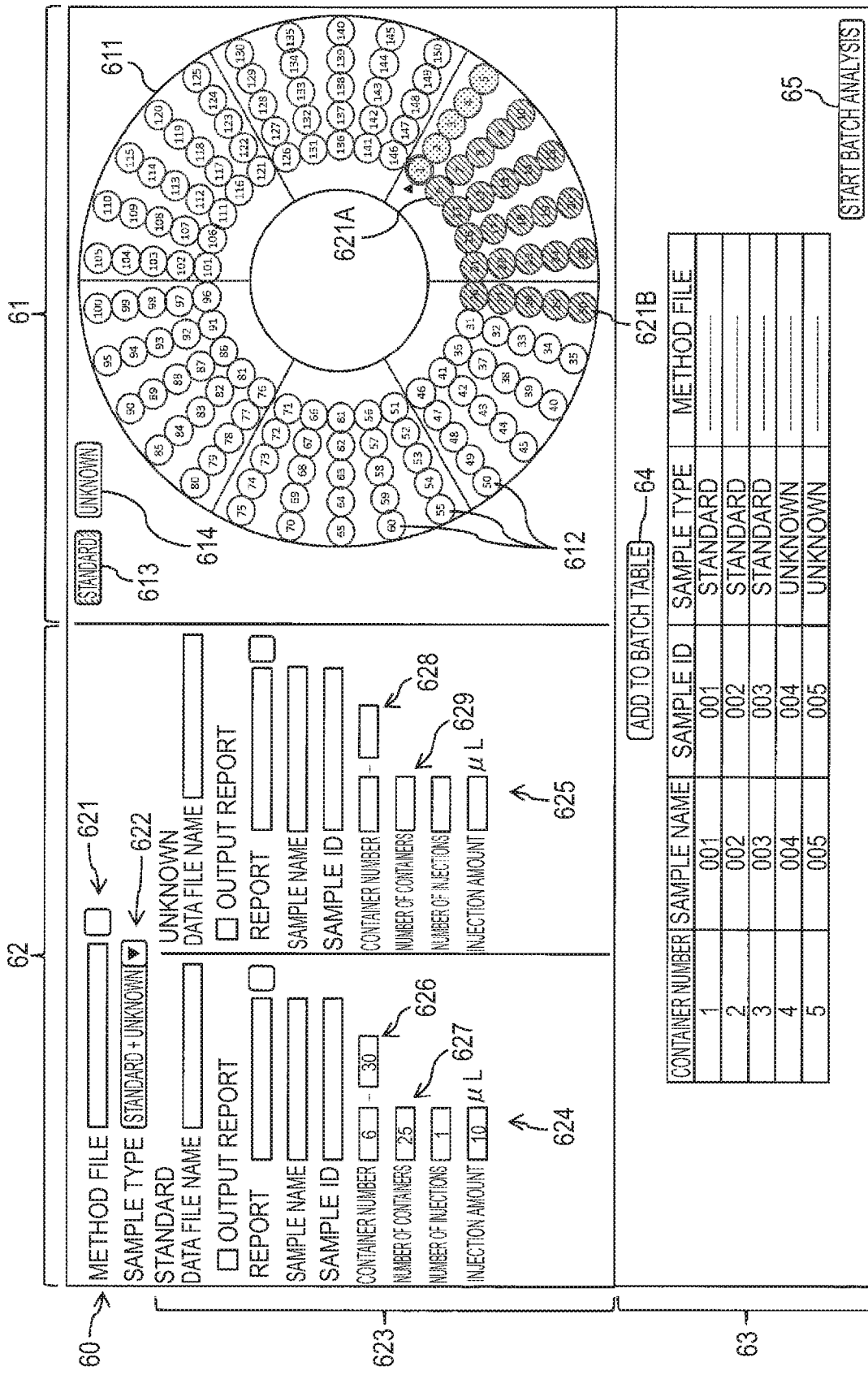
FIG. 3A is a diagram for description of a mode of selecting a container number of each sample container in an image display area of the setting screen.
Figure 3B:
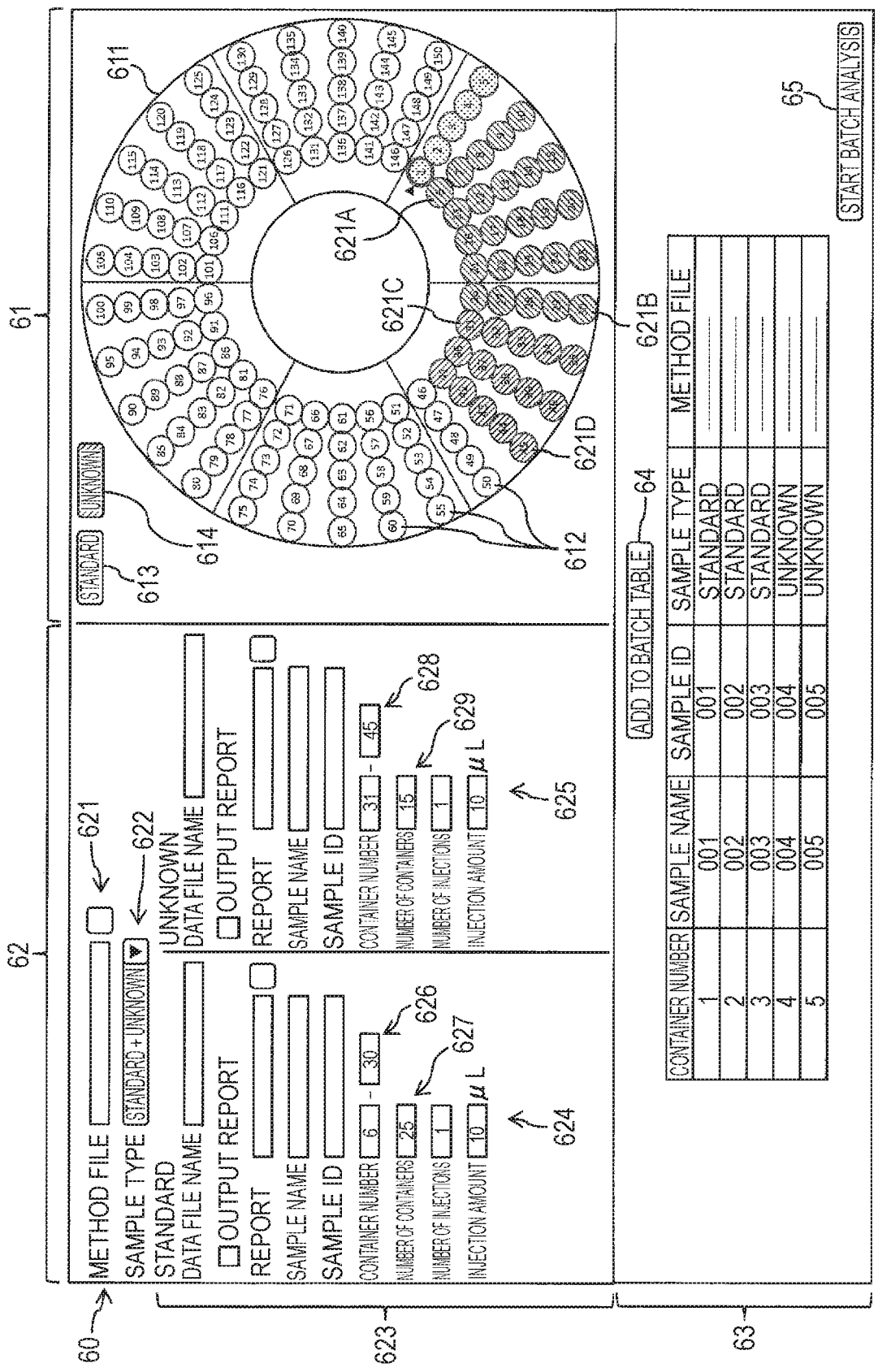
FIG. 3B is a diagram for description of a mode of selecting a container number of each sample container in the image display area of the setting screen.

FIGS. 3A to 3C are diagrams for description of modes of selecting a container number of each sample container in the image display area 61 of the setting screen 60.

In FIG. 3A, the standard key 613 is selected in the image display area 61. When an arbitrary selection area 612 is selected in this state, a container number corresponding to the selected selection area 612 may be automatically input to the container number input part 626 of the standard sample input part 624. In this instance, it is possible not only to individually select selection areas 612 one by one (individual selection), but also to select a plurality of selection areas 612 at once (multi-selection).

For example, the multi-selection of the selection areas 612 is performed by selecting two selection areas 612. A container number corresponding to one selection area 612 (612A) selected at this time becomes a start number, and a container number corresponding to another selection area 612 (612B) becomes an end number, so that these container numbers (the start number and the end number) and container numbers therebetween are displayed in the container number input part 626. In the present embodiment, container numbers representing the selected selection areas 612 are displayed in the container number input part 626 by displaying a range from the start number to the end number.

The container numbers corresponding to the selection areas 612 between the two selected selection areas 612A and 612B are selected according to a predetermined order. For example, the predetermined order is an order of the container numbers. In an example of FIG. 3A, since the start number is "6" and the end number is "30", container numbers "7" to "29" therebetween are automatically selected.

As a scheme of selecting the plurality of selection areas 612, for example, the selection area 612A corresponding to the start number is clicked with a mouse, the mouse is moved to the selection area 612B corresponding to the end number in the clicked state (pressed state), and the clicked state is released at the position. In this way, it is possible to select the start number and the end number by a simple operation.

That is, since the container numbers corresponding to the two selection areas 612A and 612B and the selection areas 612 between the two selection areas 612A and 612B may be selected only by selecting the two selection areas 612A and 612B through the above-described operation to perform an operation of inputting the container numbers to the container number input part 626, it is possible to improve work efficiency. However, a scheme of selecting the two selection areas 612A and 612B is not limited to the above-described scheme. For example, it is possible to adopt a configuration in which a selection mode is switched between a time at which the selection area 612A corresponding to the start number is selected and a time at which the selection area 612B corresponding to the end number is selected.

When a selection area 612 corresponding to a sample container that accommodates the standard sample is selected as described above, the selected selection area 612 is displayed in a different mode (for example, a different color) from that of a selection area 612 which is not selected. The number of selected selection areas 612 ("25" in this example) is displayed in the number-of-containers input part 627.

In FIG. 3B, the unknown key 614 is selected in the image display area 61 from the state of FIG. 3A. When an arbitrary selection area 612 is selected in this state, a container number corresponding to the selected selection area 612 may be automatically input to the container number input part 628 of the unknown sample input part 625. In this instance, similarly to the case of FIG. 3A, it is possible not only to individually select selection areas 612, but also to select a plurality of selection areas.

Multi-selection of the selection areas 612 may be performed in the same mode as that in the case of FIG. 3A. For example, the multi-selection is performed by selecting two selection areas 612. A container number corresponding to one selection area 612 (612C) selected at this time becomes a start number, and a container number corresponding to another selection area 612 (612D) becomes an end number, so that these container numbers (the start number and the end number) and container numbers therebetween are displayed in the container number input part 628.

The container numbers corresponding to the selection areas 612 between the two selected selection areas 612C and 612D are selected according to a predetermined order. For example, the predetermined order is an order of the container numbers. In an example of FIG. 3B, since the start number is "31" and the end number is "45", container numbers "32" to "44" therebetween are automatically selected.

When a selection area 612 corresponding to a sample container that accommodates the unknown sample is selected as described above, the selected selection area 612 is displayed in a different mode (for example, a different color) from that of a selection area 612 which is not selected and the selection area 612 selected in association with the standard sample. The number of selected selection areas 612 ("15" in this example) is displayed in the number-of-containers input part 629.

In addition, a selection area 612 corresponding to a container number previously added to the batch table ("1" to "5" in this example) is displayed in a different mode (for example, a different color) from that of the selection area 612 which is not selected, the selection area 612 selected in association with the standard sample, and the selection area 612 selected in association with the unknown sample. As described above, in the image display area 61, the selection area 612 corresponding to the container number added to the batch table, a selection area 612 corresponding to a container number of a sample container selected on the setting screen 60 without being added to the batch table, and a selection area 612 corresponding to a container number of a sample container not selected on the setting screen 60 without being added to the batch table are displayed in different modes, respectively.

In this way, it is possible to easily verify whether a selection area corresponds to the selection area 612 corresponding to the container number added to the batch table, the selection area 612 corresponding to a container number of the sample container selected on the setting screen 60 without being added to the batch table, and the selection area 612 corresponding to the container number of the sample container not selected on the setting screen 60 without being added to the batch table according to the display modes of the respective selection areas 612. Therefore, a setting state of each selection area 612 is easy to visually recognize, and thus it is possible to more effectively prevent a container number from being erroneously input at the time of setting an analysis condition.

In FIG. 3C, the unknown key 614 is selected in the image display area 61 from the state of FIG. 3A. However, a mode of selection of a selection area 612 thereafter is different from that in the case of FIG. 3B. Specifically, when a selection area 612 (612E) previously selected in association with the standard sample is selected, a container number corresponding to the selection area 612E becomes a start number, and a subsequently selected selection area 612F corresponds to an end number.

When a selection area 612 previously selected for a different type of sample is selected as described above, previously performed selection is canceled, and a newly performed selection takes precedence. As a result, the container numbers (the start number and the end number) corresponding to the newly selected selection area 612 and a container number therebetween are displayed in the container number input part 628.

In an example of FIG. 3C, since the start number is "26", and the end number is "45", container numbers "27" to "44" therebetween are automatically selected, and a range of the container numbers is displayed in the container number input part 628. The number of selected selection areas 612 ("20" in this example) is displayed in the number-of-containers input part 629. In addition, in response to cancellation of the previously performed selection, the end number is changed from "30" to "25" in the container number input part 626 of the standard sample input part 624, and the number in the number-of-containers input part 627 is changed from "25" to "20".

As described above, in the present embodiment, even when the same selection area 612 is selected for different types of samples, one selection is canceled, and thus the same container number is not erroneously input. Therefore, even when a plurality of types of samples is used, it is possible to reliably prevent the container number from being erroneously input at the time of setting the analysis condition.

However, the invention is not limited to a configuration in which previously performed selection is canceled, and newly performed selection takes precedence. For example, it is possible to adopt a configuration to cancel selection of a previously selected selection area 612 among newly selected selection areas 612. In addition, it is possible to adopt a configuration to notify the operator that a newly selected selection area 612 has been previously selected through display on the display unit 6.

Figure 4:
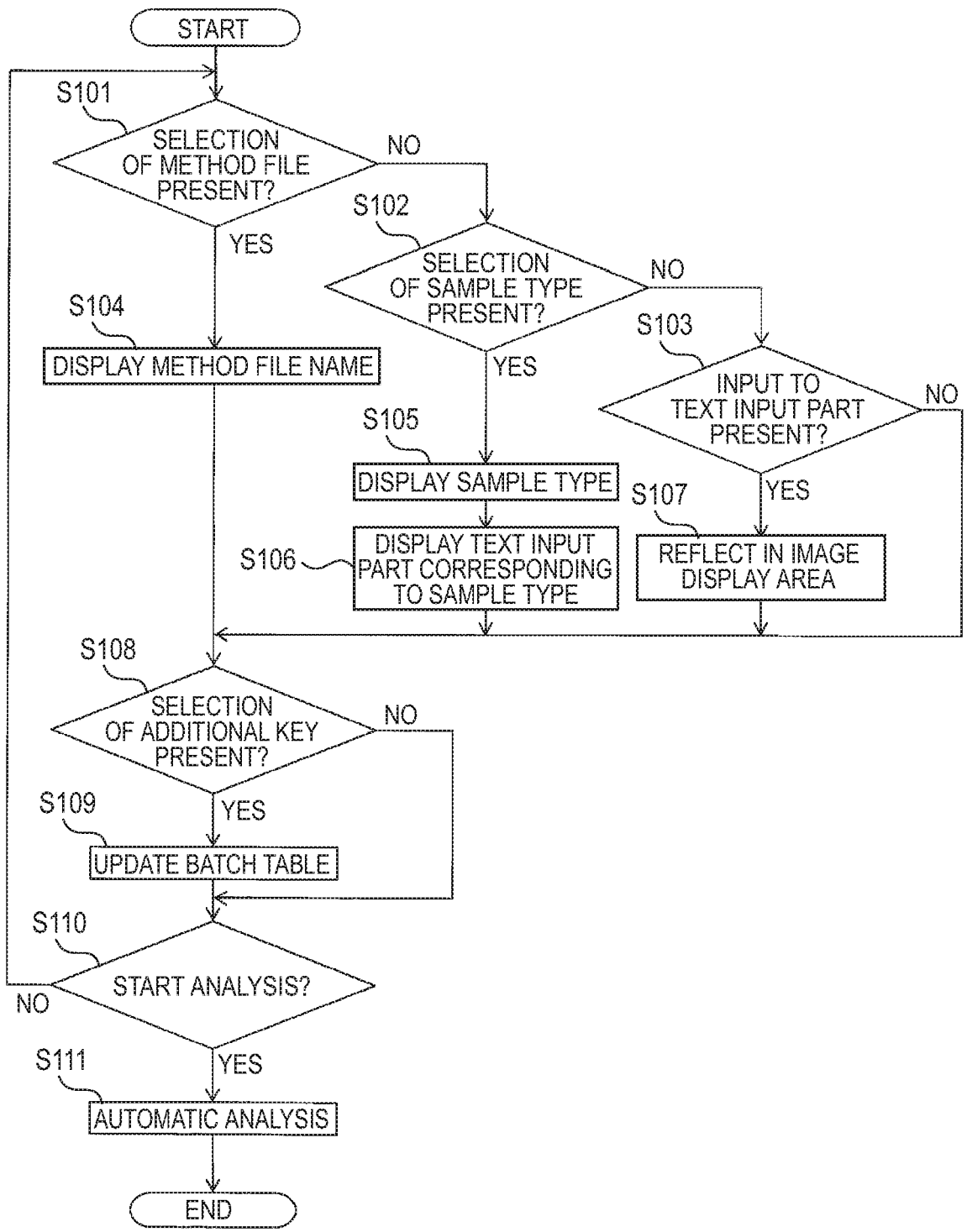
FIG. 4 is a flowchart illustrating an example of processing by a controller when a setting operation for a text display area is performed.

FIG. 4 is a flowchart illustrating an example of processing by the controller 5 when a setting operation for the text display area 62 is performed. In the text display area 62, an input operation may be performed by an operation on the method file selection part 621, the sample type selection part 622, or the text input part 623 (steps S101 to S103).

For example, when a method file is selected by an operation on the method file selection part 621 (Yes in step S101), a name of the selected method file is displayed in the method file selection part 621 (step S104). When a sample type is selected by an operation on the sample type selection part 622 (Yes in step S102), the selected sample type is displayed in the sample type selection part 622 (step S105). In this instance, a display of the text input part 623 is switched according to the selected sample type (for example, "standard", "unknown" or "standard+unknown") (step S106).

When an input operation on the text input part 623 such as the container number input parts 626 and 628 is performed (Yes in step S103), not only character information such as an input figure is displayed in the text input part 623, but also content thereof is reflected in the image display area 61 (step S107). When the additional key 64 is selected after an arbitrary setting operation is performed in this way (Yes in step S108), the batch table in the batch table display area 63 is updated by creating the batch file in association with each selected container number and method file (step S109).

When the analysis start key 65 is selected (Yes in step S110) after such a selection operation is repeatedly performed, and the batch table in which the sample type and the method file are associated with each container number is created, automatic analysis is performed based on the created batch file (step S111).

FIG. 5 is a flowchart illustrating an example of processing by the controller 5 when a setting operation for the image display area 61 is performed. In the image display area 61, when a sample type is selected by the standard key 613 or the unknown key 614 (Yes in step S201), a mode is set to an input mode for the selected sample type (step S202).

When a selection area 612 is selected in this state (Yes in step S203), different processing is performed between a case in which only the selection area 612 is selected and a case in which another selection area 612 is subsequently selected. In more detail, when only one selection area 612 is selected (No in step S204), a process of individually selecting only the selection area 612 is performed (step S205), and reflection in the text display area 62 is performed (step S207) by displaying a container number corresponding to the selected selection area 612 in the container number input part 626 or the container number input part 628.

On the other hand, when a start number and an end number are selected by successively selecting a plurality of selection areas 612 in the modes illustrated in FIG. 3A to FIG. 3C, a process of selecting the plurality of selection areas 612 is performed (step S206). Then, reflection in the text display area 62 is performed (step S207) by displaying container numbers corresponding to the plurality of selected selection areas 612 in the container number input part 626 or the container number input part 628.

In the above embodiment, a description has been given of a configuration in which a container number representing a selected selection area 612 is displayed in one of the container number input parts 626 and 628 by displaying a range from a start number to an end number. However, the invention is not limited to such a configuration. For example, it is possible to adopt a configuration in which all container numbers from a start number to an end number are displayed in one of the container number input parts 626 and 628.

In addition, in the above embodiment, a description has been given of a configuration in which content set in the image display area 61 is reflected in the text display area 62, and content set in the text display area 62 is reflected in the image display area 61. However, the invention is not limited to such a configuration, and it is possible to adopt a configuration in which only content set in the image display area 61 is reflected in the text display area 62, or a configuration in which only content set in the text display area 62 is reflected in the image display area 61.

The image display area 61 is not limited to a configuration in which the image 611 imitating the plan view of the container holding unit 1 is displayed. That is, another arbitrary image may be displayed without being limited to the image 611 when an image in which a selection area is assigned for each container number corresponding to each sample container is displayed in the image display area 61.

The invention claimed is:

1. An automatic analysis device comprising:
    a container holding unit that holds a plurality of sample containers in association with different container numbers;
    a display unit that displays a setting screen for setting an analysis condition for a sample in each of the sample containers;
    an operation unit operated when setting on the setting screen is performed;
    a display controller that switches a display of the setting screen based on an operation of the operation unit;
    a storage unit that stores the analysis condition for the sample in each of the sample containers set by the setting screen; and
    an automatic analysis controller that automatically analyzes the sample in each of the sample containers based on the analysis condition stored in the storage unit,
    wherein the setting screen includes
        an image display area in which an image is displayed for each container number corresponding to each of the sample containers, a selection area being assigned to the image, and
        a text display area in which a minimum container number and a maximum container number representing the sample containers are displayed, and
    the display controller displays, in the text display area, the minimum container number and the maximum container number representing selection areas in the image display area when a plurality of selection areas are selected by an operation of the operation unit, and switches a display mode of selection areas corresponding from the minimum container number to the maximum container number representing selected sample containers when the minimum container number or the maximum container number displayed in the text display area is changed by an operation of the operation unit.

2. The automatic analysis device according to claim 1, wherein when a plurality of types of samples is used, the display controller simultaneously displays the text display area corresponding to the respective types of samples on the setting screen.

3. The automatic analysis device according to claim 2, wherein in a case in which a selection area in the image display area has been previously selected for a different type of sample when the selection area is selected by the operation of the operation unit, the display controller cancels one of the selections and displays a container number representing the selected selection area in the text display area corresponding to a selected type of sample.

4. The automatic analysis device according to claim 1, wherein when two selection areas in the image display area are selected by the operation of the operation unit, the display controller selects container numbers corresponding to the two selection areas and a selection area between the two selection areas according to a predetermined order, and displays the selected container numbers representing the selection areas in the text display area.

5. The automatic analysis device according to claim 1, wherein the setting screen includes a batch table display area that displays a batch table in which the container number of each sample container selected on the setting screen is associated with the analysis condition for a sample in each sample container.

6. The automatic analysis device according to claim 5, wherein a selection area corresponding to a container number added to the batch table, a selection area corresponding to a container number of a sample container selected on the setting screen without being added to the batch table, and a selection area corresponding to a container number of a sample container not selected on the setting screen without being added to the batch table are displayed in different modes in the image display area.

* * * * *